(12) United States Patent
Mazzali et al.

(10) Patent No.: US 8,503,850 B2
(45) Date of Patent: Aug. 6, 2013

(54) HYBRID CONNECTOR TOOL FOR INTEGRATED CLEAVING

(75) Inventors: Claudio Mazzali, Painted Post, NY (US); Rainer Matthias Kossat, Aschau (DE); Heinz Kronawitter, Hauzenberg (DE)

(73) Assignee: Corning Incorporated, Corning, NY (US)

( * ) Notice: Subject to any disclaimer, the term of this patent is extended or adjusted under 35 U.S.C. 154(b) by 126 days.

(21) Appl. No.: 13/272,795

(22) Filed: Oct. 13, 2011

(65) Prior Publication Data
US 2012/0033930 A1 Feb. 9, 2012

Related U.S. Application Data

(62) Division of application No. 12/436,475, filed on May 6, 2009, now Pat. No. 8,068,713.

(51) Int. Cl.
*G02B 6/00* (2006.01)
(52) U.S. Cl.
USPC .......................................... 385/134; 385/137

(58) Field of Classification Search
None
See application file for complete search history.

(56) References Cited

U.S. PATENT DOCUMENTS

| | | | |
|---|---|---|---|
| 4,249,305 A | 2/1981 | Basile | 30/164.9 |
| 4,458,985 A | 7/1984 | Balliet et al. | 350/96.21 |
| 4,842,361 A | 6/1989 | Schrauder | 350/96.2 |
| 5,046,252 A | 9/1991 | Ayuta et al. | 30/258 |
| 6,357,933 B1 | 3/2002 | Bradley et al. | 385/81 |
| 7,104,702 B2 | 9/2006 | Barnes et al. | 385/77 |
| 7,204,644 B2 | 4/2007 | Barnes et al. | 385/77 |
| 7,270,487 B2 | 9/2007 | Billman et al. | 385/77 |

FOREIGN PATENT DOCUMENTS

| | | |
|---|---|---|
| DE | 102005001950 | 7/2006 |
| EP | 0082897 | 12/1981 |
| FR | 2578985 | 3/1985 |
| JP | 11263635 A * | 9/1999 |

* cited by examiner

*Primary Examiner* — Sarah Hahm
(74) *Attorney, Agent, or Firm* — Matthew J. Mason

(57) ABSTRACT

A hybrid optical fiber connector tool is capable of cleaving an optical fiber inserted into the connector tool. The connector tool includes an inner housing, an outer housing that is rotatable with respect to the inner housing, and an optical fiber cutting component. The connector tool is useful for connecting and cutting optical fiber in the field.

11 Claims, 7 Drawing Sheets

US 8,503,850 B2

HYBRID CONNECTOR TOOL FOR INTEGRATED CLEAVING

CROSS-REFERENCE TO RELATED APPLICATIONS

This is a divisional of U.S. patent application Ser. No. 12/436,475 filed on May 6, 2009 now U.S. Pat. No. 8,068,713, the content of which is relied upon and incorporated herein by reference in its entirety, and the benefit of priority under 35 U.S.C. §120 is hereby claimed.

FIELD OF THE INVENTION

The present invention relates generally to optical fiber connectors and tools, and particularly to hybrid optical fiber connector tools that have an integrated cleaving capability for field installation.

TECHNICAL BACKGROUND

In order to provide the desired signal transmission characteristics, a number of optical fiber connectors have been developed which are mounted to the end portion of an optical fiber during a factory assembly process. By mounting the optical fiber connector to the optical fiber at the factory, the assembly of the optical fiber connector can be standardized such that inconsistent assembly and other problems associated with the field installation of the connector are avoided.

However, the factory installation of optical fiber connectors is not altogether satisfactory for every application. In particular, the factory installation of optical fiber connectors does not customize the installation process to account for the myriad of design variations expected in the field. For example, by installing optical fiber connectors to the end portion of an optical fiber at the factory, the length of the connectorized optical fiber is fixed, thus requiring excess length and coiling to insure sufficient length for all applications. In addition, in many instances it is desirable to cut a length of optical fiber into a plurality of shorter lengths, each of which must be individually connected, such as by an optical fiber connector, to another optical fiber or to a patch panel or other type of terminal. However, the respective lengths of the shorter optical fibers cannot generally be determined until the optical fibers are installed in the field.

In order to address one or more of the above referenced problems, solutions have been devised to install connectors onto optical fiber in the field. Such solutions, however, typically require numerous tools and time consuming process steps in order to terminate and connect the optical fiber.

SUMMARY

Disclosed herein is an optical fiber connector tool that includes an inner housing defining an interior passageway extending longitudinally between a first end and a second end for accepting an optical fiber therethrough. The inner housing includes a plurality of longitudinally extending clamping surfaces. In addition, the connector tool includes at least one outer housing surrounding at least a portion of the inner housing. The at least one outer housing is movable with respect to the inner housing. The connector tool also includes at least one optical fiber cutting component that is moveable from a first position to a second position. The second position is closer to an axis along the center of the interior passageway than the first position.

Also disclosed herein is a method of connecting an optical fiber to a connector tool. The method includes passing an optical fiber through an interior passageway extending longitudinally between a first end and a second end of an inner housing. The optical fiber has a longitudinal axis and the inner housing includes a plurality of longitudinally extending clamping surfaces. In addition, the method includes clamping at least a portion of the optical fiber in the interior passageway by causing at least a portion of the longitudinally extending clamping surfaces to compress radially inward. The method also includes cutting or scoring the optical fiber by contacting the fiber with at least one optical fiber cutting component. The cutting component is moved from a first position to a second position. The second position is closer to the longitudinal axis of the optical fiber than the first position.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
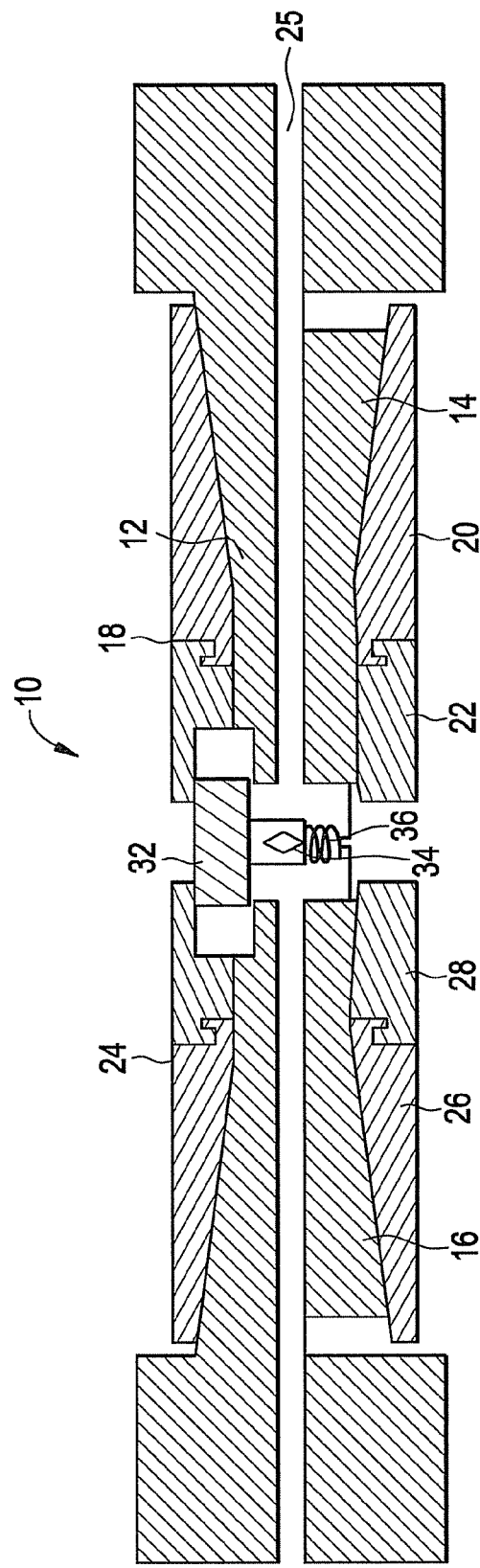
FIG. 1 illustrates a side cutaway view of one embodiment as disclosed herein.

Reference will now be made in detail to the present preferred embodiments of the invention, examples of which are illustrated in the accompanying drawings. Whenever possible, the same reference numerals will be used throughout the drawings to refer to the same or like parts.

FIG. 1 illustrates a partial side cutaway view of a preferred embodiment as disclosed herein. Hybrid optical fiber connector tool 10 includes inner housing 12, first outer housing 18, and second outer housing 24. Inner housing 12 defines an interior passageway 25 extending longitudinally between a first end and a second end for accepting optical fiber therethrough. In addition, inner housing 12 includes a first plurality of longitudinally extending clamping surfaces 14 and a second plurality of longitudinally extending clamping surfaces 16, wherein both the first plurality of longitudinally extending clamping surfaces 14 and the second plurality of longitudinally extending clamping surfaces 16 surround interior passageway 25 of inner housing 12. First plurality of longitudinally extending clamping surfaces 14 extend longitudinally along inner housing from near a midpoint of inner housing 12 to near a first end of inner housing 12 and second plurality of longitudinally extending clamping surfaces 16 extend longitudinally along inner housing from near a midpoint on the opposite side of inner housing 12 to near a second end of inner housing 12. Inner housing 12 preferably has an outer diameter that is smallest at about its midpoint in the longitudinal direction and increases in diameter with increasing axial distance from the midpoint, as shown in FIG. 1. Preferably, inner housing 12 and first and second longitudinally extending clamping surfaces 14 and 16 are made of a flexible plastic material, such as 10% glass fiber reinforced polyphenylene sulfide (PPS/F GF10). Preferably, inner housing 12 is of unitary construction.

Preferably, first and second plurality of longitudinally extending clamping surfaces 14 and 16 each include at least 3 clamping surfaces, such as at least 4 clamping surfaces, and further such as at least 6 clamping surfaces. In a preferred embodiment, the outer diameter defined by clamping surfaces 14 and 16 increases with increasing axial distance from the longitudinal midpoint of inner housing 12.

First outer housing 18 includes first outer shell 20 and first clamping cylinder 22. Second outer housing 24 includes second outer shell 26 and second clamping cylinder 28. Preferably, first and second outer shells 20 and 26 are made from flexible plastic material, such as 10% glass fiber reinforced polyphenylene sulfide (PPS/F GF10). Each of first outer housing 18 and second outer housing 24 surround a portion of opposing sides of inner housing 12 in the longitudinal direction and each of first outer housing 18 and second outer housing 24 is rotatable with respect to inner housing 12. In addition, each of first outer housing 18 and second outer housing 24 is movable in the axial direction.

Hybrid connector tool 10 also includes an optical fiber cutting component 32 that includes a cutting blade 34. In the embodiment shown in FIG. 1, optical fiber cutting component 32 is axially between first outer housing 18 and second outer housing 24.

In addition, hybrid connector tool 10 includes at least one biasing component, such as spring 36, that is capable of providing an opposing biasing force against movement of the optical fiber cutting component 32.

Figure 2:
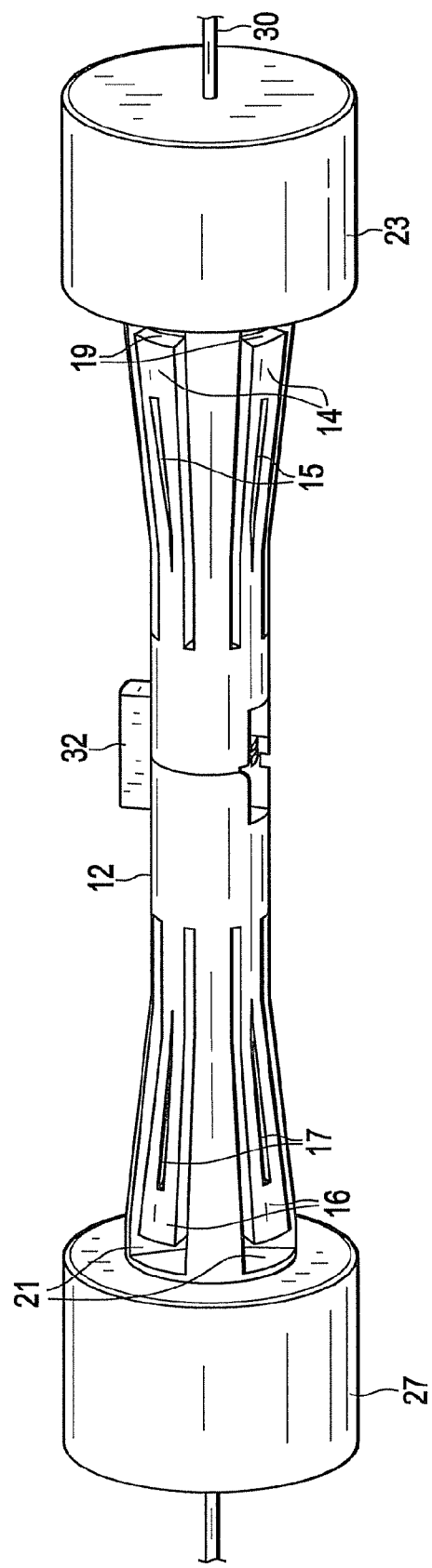
FIG. 2 illustrates a perspective view of a portion of the embodiment shown in FIG. 1.

FIG. 2 illustrates a perspective view of a portion of the embodiment shown in FIG. 1, in which first outer housing 18 and second outer housing 24 are not shown for ease of viewing inner housing 12, including first and second plurality of longitudinally extending clamping surfaces 14 and 16. First plurality of longitudinally extending clamping surfaces 14 extend longitudinally along inner housing from near a midpoint of inner housing 12 to near a first end of inner housing 12 and second plurality of longitudinally extending clamping surfaces 16 extend longitudinally along inner housing from near a midpoint on the opposite side of inner housing 12 to near a second end of inner housing 12. Preferably, first and second plurality of longitudinally extending clamping surfaces 14 and 16 are finger-shaped in the axial direction, such that gaps 19 and 21 are present in the axial direction between the ends of first and second plurality of longitudinally extending clamping surfaces 14 and 16 and first and second end portions 23 and 27 of inner housing. Preferably, first and second plurality of longitudinally extending clamping surfaces 14 and 16 are wedge-shaped in the radial direction, such that their cross-sectional thickness increases with increasing radial distance from interior passageway 25. Preferably, first and second plurality of longitudinally extending clamping surfaces 14 and 16 each include ramped portions 15 and 17 on their outermost surfaces.

Figure 3:
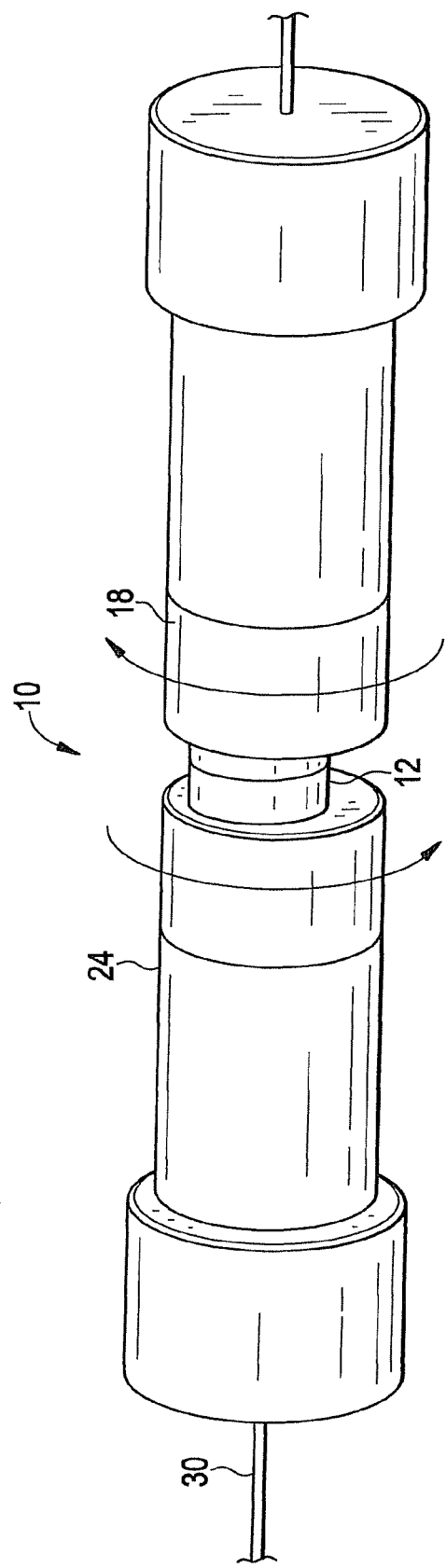
FIG. 3 illustrates a perspective view of the embodiment shown in FIG. 1.

FIG. 3 illustrates a perspective view of the embodiment shown in FIG. 1, including first outer housing 18 and second outer housing 24. In operation, optical fiber 30 is first passed through the interior passageway of inner housing 12. Next, first outer housing 18 and second outer housing 24 are moved or pulled by a user in opposing axial directions, resulting in the embodiment illustrated in FIG. 3. The opposing axial movement of first and second outer housings 18 and 24 causes at least a portion of the plurality of longitudinally extending clamping surfaces 14 and 16 to compress radially inward thereby clamping at least a portion of optical fiber 30 in the interior passageway.

Figure 4:
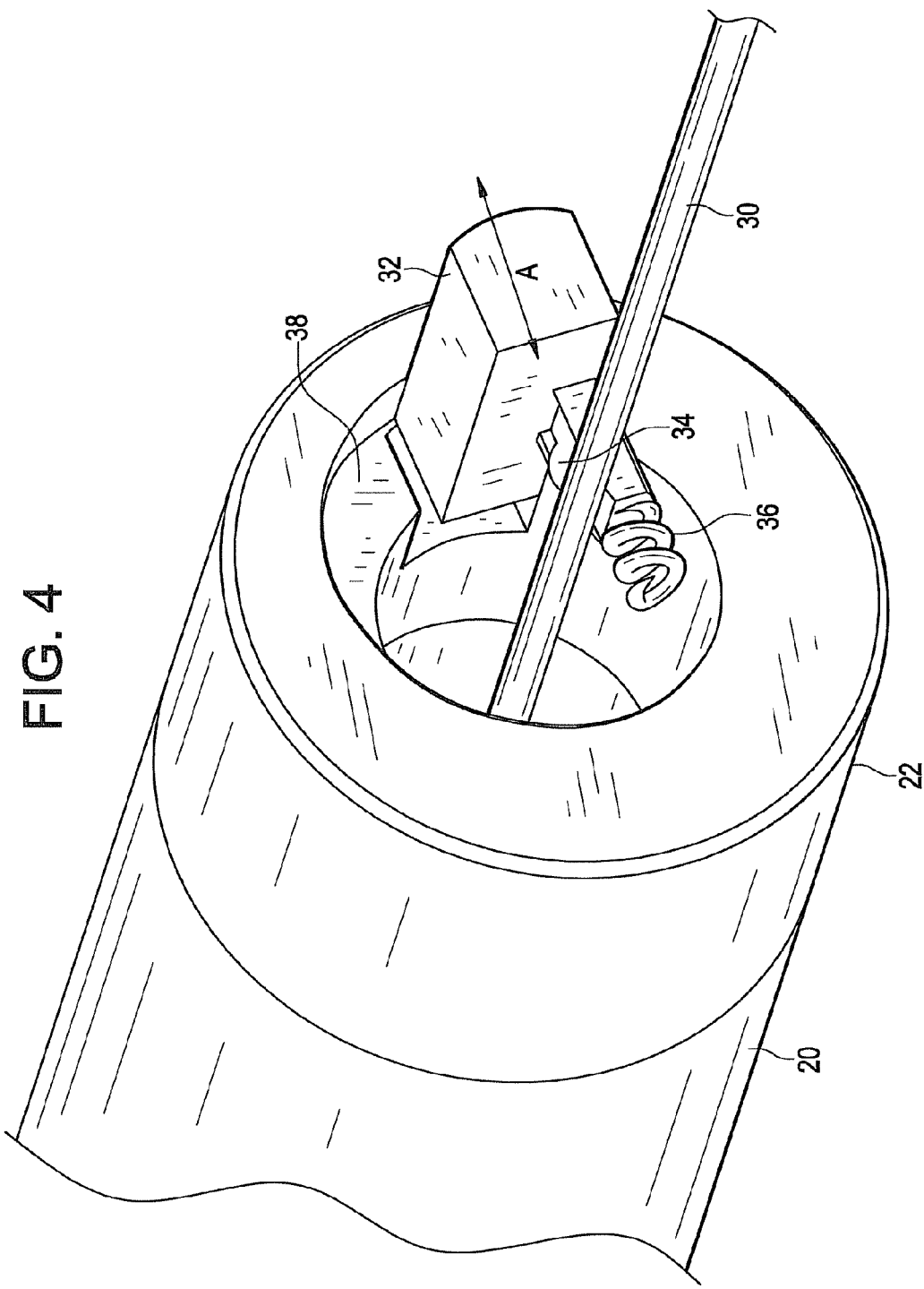
FIG. 4 illustrates a perspective view of a portion of the embodiment shown in FIG. 1.

FIG. 4 illustrates a perspective view of a portion of the embodiment shown in FIG. 1 in which inner housing 12 and outer housing 24 are not shown for ease of viewing other components of hybrid connector tool 10. As shown in FIG. 4, an end of clamping cylinder 22 has a ramped surface 38. End of clamping cylinder 28 (not shown) also has a ramped surface. Counter rotation of first and second outer housings 18 and 24, as shown by the arrows in FIG. 3, causes optical fiber cutting component 32 to be guided along ramped surfaces which results in movement of optical fiber cutting component 32 in the direction indicated by arrow A, as shown in FIG. 4. Specifically, counter rotation of first and second outer housings 18 and 24 causes optical fiber cutting component 32 to move from a first position to a second position, wherein the second position is closer to the longitudinal axis of optical fiber 30 than the first position or, in other words, the second position is closer to an axis along the center of the interior passageway than the first position. As optical fiber cutting component 32 is moved in the direction of the left end of arrow A (i.e., towards spring 36) at least a portion of cutting blade 34 contacts optical fiber 30 thereby scoring or cutting optical fiber.

In a preferred embodiment, optical fiber 30 is a buffered optical fiber. In an alternative embodiment, optical fiber 30 may be stripped of buffering material. When optical fiber 30 is a buffered optical fiber, at least a portion of cutting blade 34 preferably cuts through buffering material (including optical fiber coating material) until it at least contacts the outermost cladding of the optical fiber. When the optical fiber 30 is stripped of buffering material, at least a portion of cutting blade 34 preferably at least contacts the outermost cladding of the optical fiber.

Subsequent to scoring or cutting optical fiber 30, the portion of hybrid connector tool 10 extending beyond a cut end of the optical fiber can be removed. For example, after optical fiber 30 has been cut or scored as described above, a bending tension can be applied by the user to break apart inner housing 12. In a preferred embodiment, inner housing 12 includes a weakened area at or near the same axial location as where optical fiber 30 is scored or cut in order to facilitate breaking inner housing 12 into two parts. Following this breakage, the portion of hybrid connector tool 10 extending beyond the cut end of optical fiber 20 can be removed and discarded.

Figure 5:
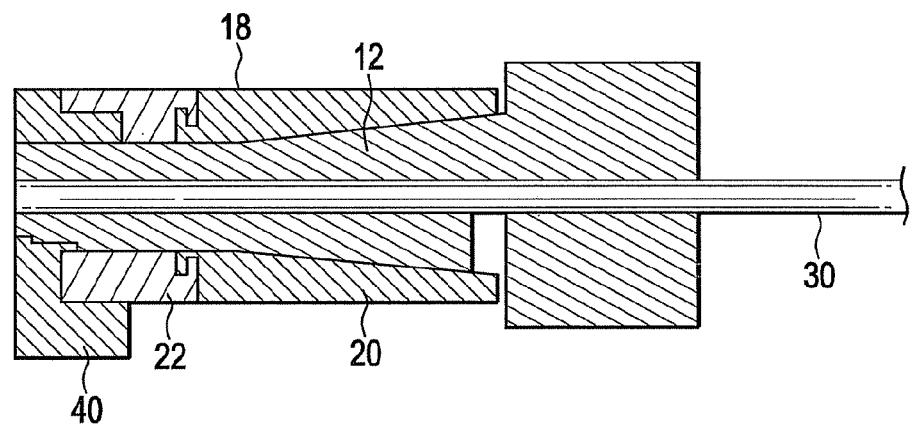
FIG. 5 illustrates a partial side cutaway view of the embodiment shown in FIG. 1 after a portion of the hybrid connector tool has been removed and replaced by a fiber guide unit.

As illustrated in FIG. 5, a fiber guide unit 40 can then be placed around the cut end of optical fiber 30. Fiber guide unit 40 can help facilitate front plug guiding of the connector tool as well as fiber centering.

Figure 6:
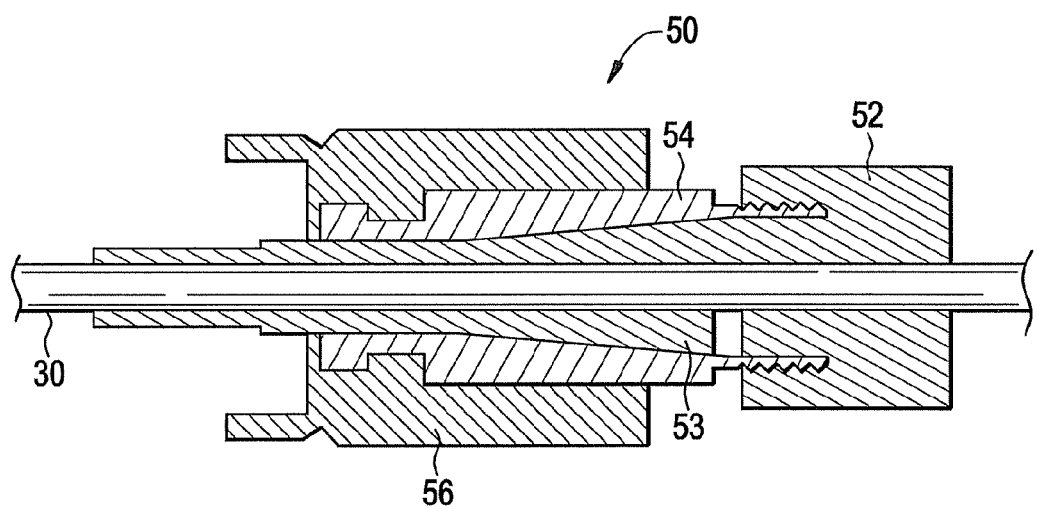
FIG. 6 illustrates a side cutaway view of an alternate embodiment of the present invention.

FIG. 6 illustrates a side cutaway view of an alternative embodiment as disclosed herein. Hybrid optical fiber connector tool 50 includes inner housing 52, clamping member 54, and outer housing 56. Inner housing 52 defines an interior passageway extending longitudinally between a first end and a second end for accepting optical fiber 30 therethrough. In addition, inner housing 52 includes a plurality of longitudinally extending clamping surfaces 53, wherein the plurality of longitudinally extending clamping surfaces 53 surround interior passageway of inner housing 52. Preferably, inner housing 52 and plurality of longitudinally extending clamping surfaces 53 are made of a flexible plastic material, such as 10% glass fiber reinforced polyphenylene sulfide (PPS/F GF10). Preferably, inner housing 52 is of unitary construction. Preferably, outer diameter of inner housing 52 increases as a function of axial distance along inner housing 52 as shown (from left to right) in FIG. 6.

Preferably plurality of longitudinally extending clamping surfaces 53 include at least 3 clamping surfaces, such as at least 4 clamping surfaces and further such as at least 6 clamping surfaces.

Clamping member 54 surrounds at least a portion of inner housing 52 and outer housing 56 surrounds at least a portion of clamping member 54. Outer housing 56 is longitudinally movable with respect to inner housing 52 and clamping member 54.

In operation, optical fiber 30 is first passed through the interior passageway of inner housing 52. Next, outer housing 56 is moved longitudinally (from left to right in the embodiment shown in FIG. 6) relative to clamping member 54 and inner housing 52. The movement of outer housing 56 relative to clamping member 54 and inner housing 52 causes at least a portion of longitudinally extending clamping surfaces 53 to compress radially inward, thereby clamping at least a portion of optical fiber 30 in the interior passageway.

Figure 7:
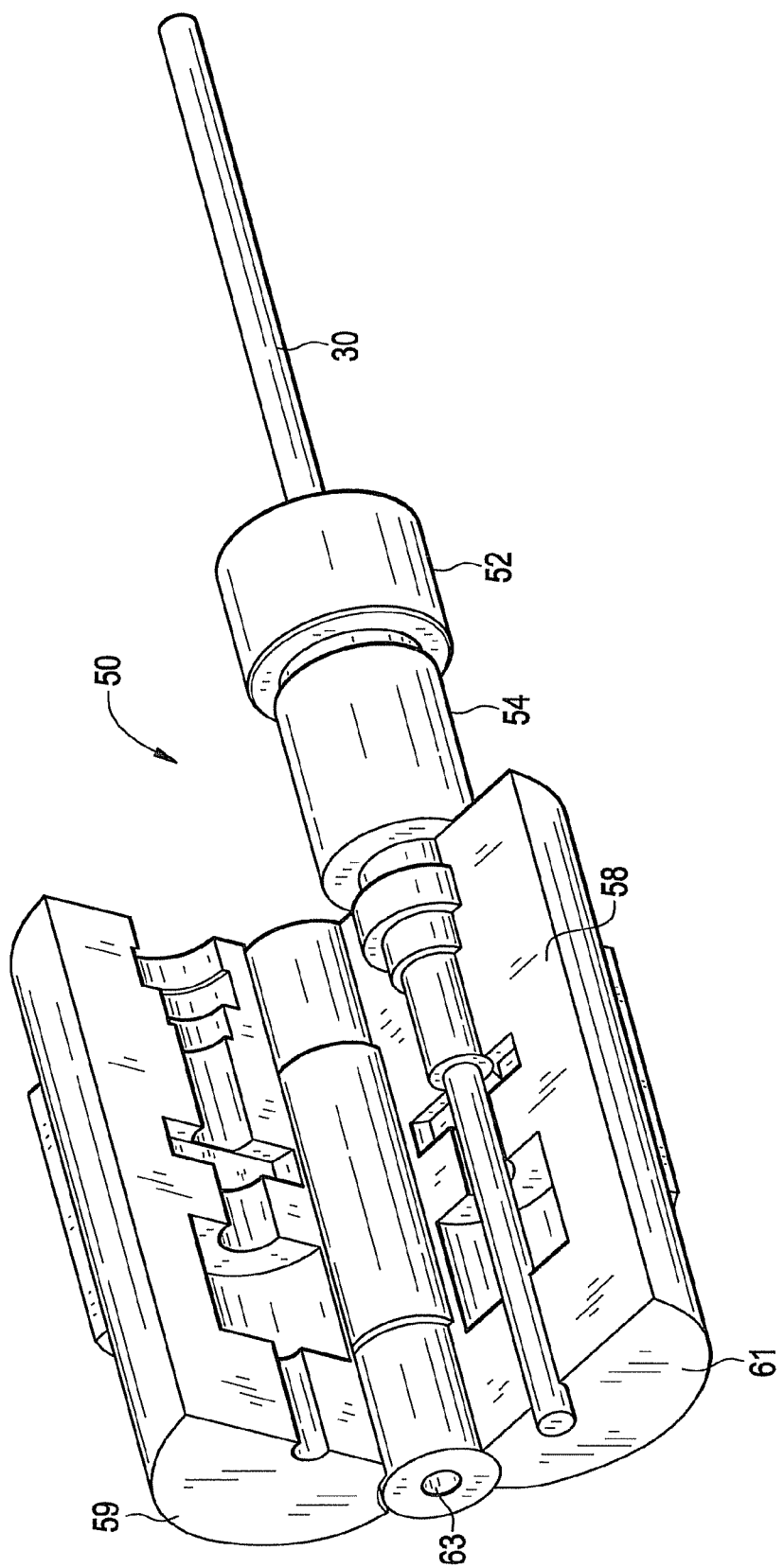
FIG. 7 illustrates a perspective view of the embodiment shown in FIG. 6 further including a cleaving component.

FIG. 7 illustrates a perspective view of a portion of the embodiment shown in FIG. 6 further including a cleaving component 58. Cleaving component 58 has a clamshell configuration including a top portion 59, bottom portion 61, and hinge 63. In the embodiment shown in FIG. 7, outer housing 56 has been removed allowing an end of cleaving component 58 to rotatably surround an end of clamping member 54 upon closure of cleaving component over the end of clamping member 54, inner housing 52, and optical fiber 30.

Figure 8:
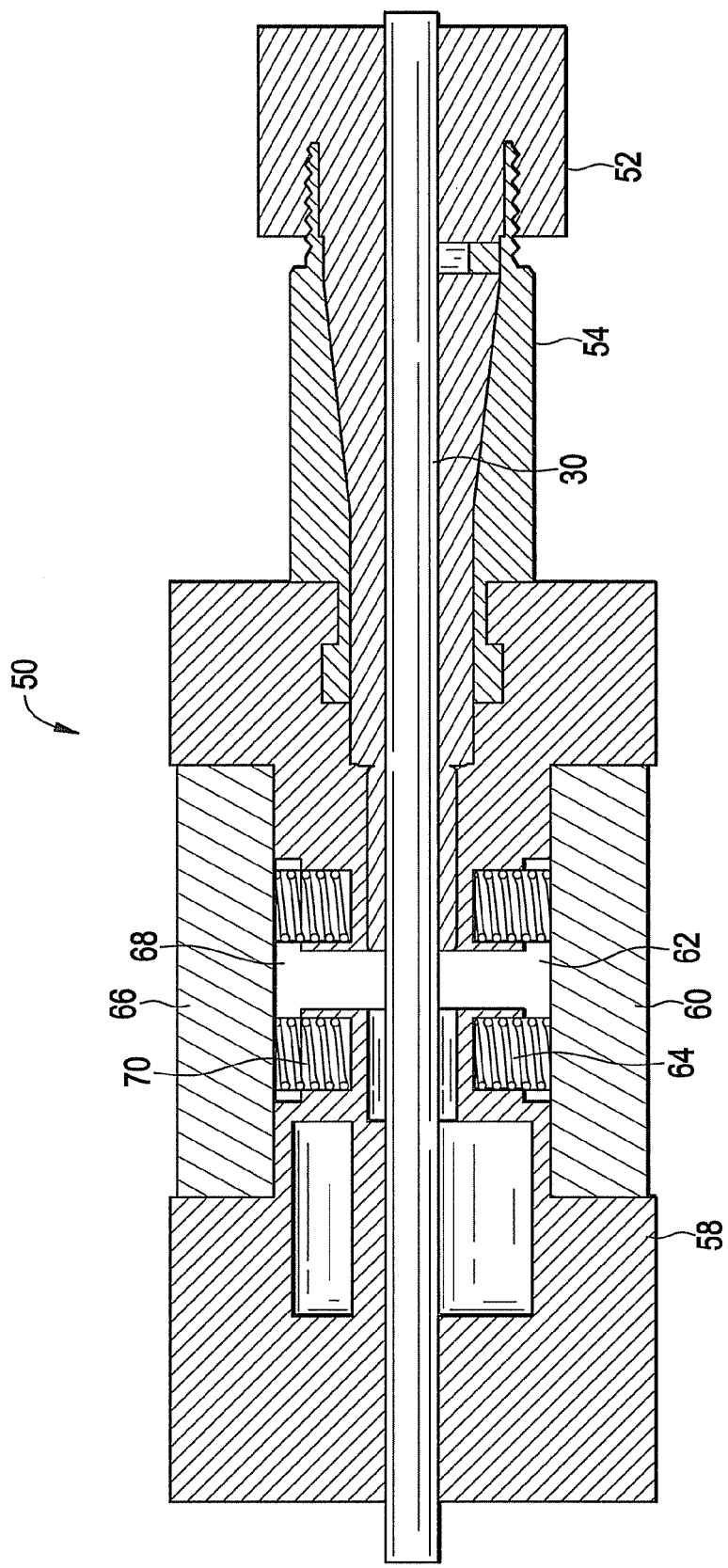
FIG. 8 illustrates a side cutaway view of a portion the embodiment shown in FIG. 7 following closure of the cleaving component.

FIG. 8 illustrates a side cutaway view of a portion of the embodiment shown in FIG. 7 following closure of the cleaving component 58. Cleaving component 58 includes first cutting component 60, which includes cutting blade 62, and second cutting component 66, which includes cutting blade 68. Cleaving component also includes sets of springs 64 and 70, which are capable of providing an opposing biasing force against movement of the cutting components 60 and 66.

Cutting components 60 and 66 are moveable from a first position to a second position wherein the second position is closer to a longitudinal axis of the optical fiber than the first position. Specifically, application of pressure on an outer surface of cutting components 60 and 66 causes cutting components 60 and 66 to move radially inward from the first position to the second position. While cutting components 60 and 66 are in the second position, cleaving component 58 is rotated relative to inner housing 52 and optical fiber 30, in contact with cutting blades 62 and 68, is scored or cut.

In a preferred embodiment, optical fiber 30 is a buffered optical fiber. In an alternative embodiment, optical fiber 30 may be stripped of buffering material. When optical fiber 30 is a buffered optical fiber, at least a portion of cutting blades 62 and 68 preferably cut through buffering material (including optical fiber coating material) until they at least contact the outermost cladding of the optical fiber. When the optical fiber 30 is stripped of buffering material, at least a portion of cutting blades 62 and 68 preferably at least contact the outermost cladding of the optical fiber.

Subsequent to scoring or cutting optical fiber 30, cleaving component 58 can be removed and optionally discarded or reused. Similar to the embodiment shown in FIG. 5, a fiber guide unit can be placed around the cut end of optical fiber 30 to help facilitate front plug guiding of the connector tool as well as fiber centering.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical fiber connector tool comprising:
   an inner housing defining an interior passageway extending longitudinally between a first end and a second end for accepting an optical fiber therethrough, said inner housing comprising a plurality of longitudinally extending clamping surfaces;
   at least one outer housing surrounding at least a portion of said inner housing, wherein said at least one outer housing is movable with respect to said inner housing; and
   at least one optical fiber cutting component that is moveable from a first position to a second position, wherein the second position is closer to an axis along the center of the interior passageway than the first position;
   wherein the at least one optical fiber cutting component is housed within a cleaving component having a clamshell configuration and wherein application of pressure on an outer surface of said at least one optical fiber cutting component causes said at least one optical fiber cutting component to move radially inward from said first position to said second position.

2. The optical fiber connector tool of claim 1 wherein said optical fiber cutting component comprises a cutting blade.

3. The optical fiber connector tool of claim 1 wherein the connector tool comprises at least one biasing component that is capable of providing an opposing biasing force against movement of the at least one optical fiber cutting component.

4. The optical fiber connector tool of claim 3 wherein the at least one biasing component is a spring.

5. The optical fiber connector tool of claim 1 wherein the optical fiber is a buffered optical fiber.

6. A method of connecting an optical fiber to a connector tool comprising:
   passing an optical fiber through an interior passageway extending longitudinally between a first end and a second end of an inner housing, said optical fiber having a longitudinal axis and said inner housing comprising a plurality of longitudinally extending clamping surfaces;
   clamping at least a portion of the optical fiber in the interior passageway by causing at least a portion of said plurality of longitudinally extending clamping surfaces to compress radially inward; and
   cutting or scoring the optical fiber by contacting the fiber with at least one optical fiber cutting component, wherein the cutting component is moved from a first position to a second position, wherein the second position is closer to the longitudinal axis of the optical fiber than the first position;

wherein the at least one optical fiber cutting component is housed within a cleaving component having a clamshell configuration and wherein said at least one optical fiber cutting component is caused to move radially inward from said first position to said second position by application of pressure on an outer surface of said at least one optical fiber cutting component and wherein said optical fiber is cut or scored by rotating said cleaving component relative to said inner housing as said at least one optical fiber cutting component is in said second position.

7. The method of claim 6 wherein said optical fiber cutting component comprises a cutting blade.

8. The method of claim 6 wherein the connector tool comprises at least one biasing component that is capable of providing an opposing biasing force against movement of the at least one optical fiber cutting component.

9. The method of claim 8 wherein the at least one biasing component is a spring.

10. The method of claim 6 wherein the optical fiber is a buffered optical fiber.

11. The method of claim 6 wherein the method further comprises placing a fiber guide unit around the cut end of the optical fiber.

* * * * *